Patented Mar. 16, 1937

2,073,927

UNITED STATES PATENT OFFICE 2,073,927

ADHESIVE COMPOSITION

Arthur D. Fuller, New York, N. Y., assignor to National Adhesives Corporation, New York, N. Y., a corporation of Delaware No Drawing. Application December 21, 1934, Serial No. 758,550

3 Claims. (Cl. 134—17)

This invention relates to adhesives, and more particularly to the preparation of an adhesive to be used for attaching labels and other materials to surfaces that are not permeable to ordinary aqueous adhesives, such, for example, as varnished, waxed, oiled and inked surfaces.

It has long been known that solutions or dispersions of rubber lend themselves to the preparation of suitable adhesives. There are two major forms in which rubber solutions are available. For many years some form of rubber dissolved in an organic solvent has been employed for the preparation of adhesives. In recent years, there has been a marked tendency towards the use of aqueous dispersions of rubber, one of the most popular of which is natural rubber emulsion, known to the trade as latex. While latex itself can be used for the preparation of adhesives, it possesses certain great disadvantages.

These disadvantages are chiefly the unstable character of latex solutions, the watery character of these solutions, the disagreeable odor thereof and the lack of adhesiveness when applied to very smooth or polished surfaces. Latex solutions are unstable when exposed to air and particularly when agitated in gluing and labeling machines such as are now employed in large commercial establishments. Due to the watery and hence thin-flowing character of these solutions, it is not always possible to control the film-forming characteristics thereof. The odor is usually quite pronounced due to the customary presence of ammonium hydroxide, which odor is objectionable for many purposes. Due to the tendency of the latex solution to pull away from very smooth or polished surfaces, it lacks the required adhesion and it is difficult to apply properly deposited films thereof to surfaces that are not permeable to ordinary aqueous adhesives.

I have found that these objectionable properties can be largely eliminated by compounding the aqueous dispersion of rubber, such as a solution of latex, in certain proportions with a substance which acts as a stabilizer to increase the resistance of the rubber dispersion to coagulation and to retard freezing of the composition, and another substance which is used to control the body, tackiness and viscosity of the composition.

I have found that any of the high boiling, water-soluble glycols or glycerine are very well suited as the stabilizer substance, and that a casein solution which is maintained on the alkaline side, and which is preferably made alkaline with sodium hydroxide, is very well suited as the substance for controlling the body, tackiness and viscosity of the composition.

The use of glycol or glycerine increases the resistance of the latex solution to coagulation, this being a result of the dispersion of the rubber particles which takes place. The glycol or glycerine causes the composition to set more slowly and this appears to permit the solids in the deposited film to take firmer hold of the surfaces which are being united. The glycol or glycerine imparts greater stability generally, such as making it possible to ship the composition in cold weather with much less hazard of freezing; it is even possible to increase the amount of this glycerine as a stabilizer so as to eliminate entirely the problem of freezing even in cold weather. The glycerine ingredient acts as an anti-curling, anti-wrinkling agent, making the product very effective in laminating.

The casein solution may be dissolved in such manner that it will affect the body of the composition or latex solution almost in any manner desired. Thus, the viscosity of the latex solution may be increased to have greater tackiness or the latex solution may be transposed to a plastic state by a suitable treatment of the casein. The casein imparts tackiness and a greater clinging tendency to the latex solution. The casein also acts as a thickener giving body to the thin, watery latex dispersions.

The relative proportions of these ingredients in the composition play a marked part in producing the characteristics desired. I have found that the glycol or glycerine should predominate in quantity over the casein ingredient, and that in general the aqueous dispersion of rubber should predominate in quantity over the glycerine. I have found, for example, that the most desirable results are produced by compounding the ingredients in substantially the following proportions:

| | Percent |
|---|---|
| Latex (60% solution) | 50 |
| Glycerine | 25 |
| Casein | 4.2 |

The amount of each ingredient may be varied however, and in general, I have found that the relative proportions of these ingredients should be within the following upper and lower limits:

| | Percent |
|---|---|
| Aqueous dispersion of rubber (60%) | 40 to 75 |
| Glycerine | 15 to 40 |
| Casein | 3 to 8 |

If the amount of glycerine used is too small, curling and wrinkling of the adhesive composition results, with a loss of tackiness and adhesion. Also, the product freezes easily. If the percentage of glycerine is too large then there is a loss of tackiness of the composition, a lessening of its drying properties and a tendency for the composition to penetrate or soak into the base on which it is deposited. If the amount of the casein solution is too small, the composition suffers in body, tackiness and stability as to its machine properties. If the content of the casein solution is too large, the composition has less flexibility and adhesiveness.

A preferred example of preparing the adhesive composition of my present invention is as follows:

|  |  | Percent |
|---|---|---|
| Water _____ Pounds__ | 6.15 | 20.5 |
| Casein _____ do____ | 1.26 | 4.2 |
| Caustic _____ do____ | .09 | .3 |
| Phenol _____ grams__ | .15 | |
| Wintergreen _____ cc__ | 20 | |
| "Lotol" (60%) _____ pounds__ | .15 | 50 |
| Glycerine _____ do____ | 7.5 | 25 |

The purpose of the caustic is to put the casein into solution and to keep it on the alkaline side so as to prevent the coagulation or precipitation of the rubber dispersion. The purpose of the phenol is to act as a preservative for the casein solution. The wintergreen ingredient is used to neutralize the odor of the casein and ammonia. "Lotol" is a latex solution or dispersion having a 60% rubber content.

I prefer to process or compound the ingredients of this example in the following way. The water and the casein are first soaked together cold for about one hour. The caustic solution in the form of a 25% solution is then added and the ingredients are mixed, heat being preferably used. The phenol and the wintergreen are then added, producing a casein solution. This solution is then added slowly to a mixture of the "Lotol" and glycerine, and all of the ingredients are then well mixed.

The resulting adhesive is characterized by the ability to deposit the same into a flexible film to hold two surfaces together by means of cohesion rather than adhesion, since neither of the surfaces to be united is attacked or penetrated by the adhesive coating. I have found that this adhesive is superior to most adhesives used for surfaces which are not permeable to ordinary aqueous adhesives; and the characteristics of non-wrinkling and non-curling of the adhesives of the present invention render the same particularly suitable for laminating purposes. This characteristic of the non-wrinkling and the non-curling of the adhesives I consider is a very important feature of my present invention. The result obtained is suction stick due, I believe, to the particular way in which the rubber dispersion and glycerine components are proportioned and compounded.

Since it is apparent that many modifications may be made in the substitution of equivalents, the variation of the steps in the process, and in the variation of the proportions used, it will be understood that my invention is not limited otherwise than by the appended claims. Where I have used the term "casein" or "casein solution", it will be understood that I may employ any protein, such as gelatin, animal glue, egg albumin, etc., the expression "casein" being used in the broad sense. Where I have used the expression "glycerine", it will be understood that the equivalents thereof such as water-soluble glycols, etc., may be employed. While I have referred to the use of "Lotol", which is a 60% latex solution, it will be understood that other latex solutions may be employed.

I claim:

1. An adhesive composition comprising an aqueous dispersion of rubber, glycerine, casein and added water in the following relative proportions:

|  | Percent |
|---|---|
| Aqueous dispersion of rubber (60%) | 40 to 75 |
| Glycerine | 15 to 40 |
| Casein | 3 to 8 | and added water of the order of 20% of the total ingredients.

2. An adhesive composition comprising latex, glycerine, casein and added water in the following relative proportions:

|  | Percent |
|---|---|
| Latex | 50 |
| Glycerine | 25 |
| Casein | 4 |
| Water | 20 |

3. An adhesive composition comprising an aqueous dispersion of rubber, glycerine, casein and added water in the following relative proportions:

|  | Percent |
|---|---|
| Aqueous dispersion of rubber (60%) | 40 to 75 |
| Glycerine | 15 to 40 |
| Casein | 3 to 8 | and added water having a proportion of the total ingredients greater than the proportion of casein and less than the proportion of glycerine.

ARTHUR D. FULLER.